Nov. 11, 1924.  
F. C. DITTMAR  
1,515,153  
WHEEL  
Original Filed June 6, 1919   2 Sheets-Sheet 1
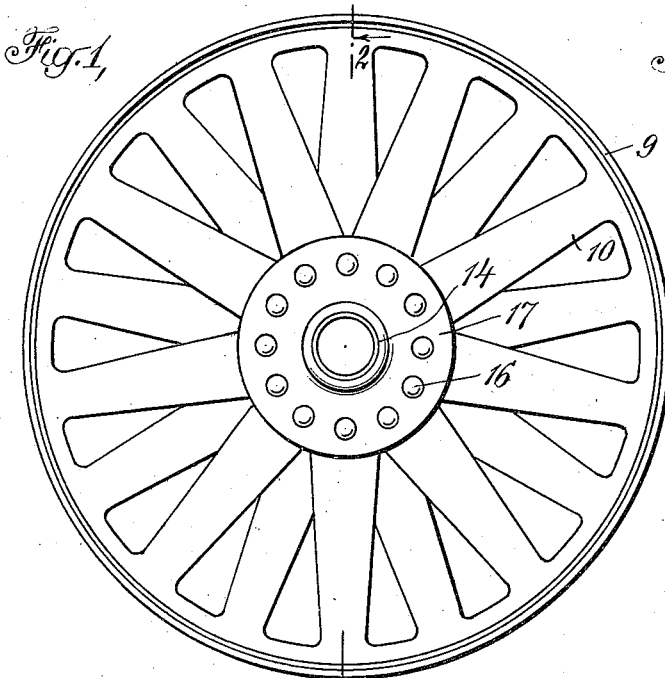
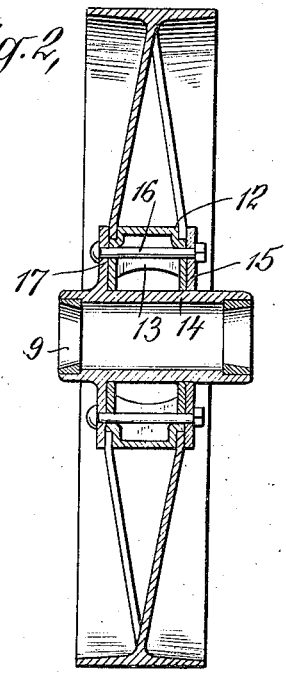
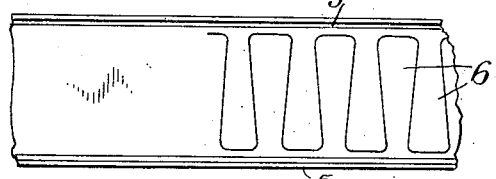
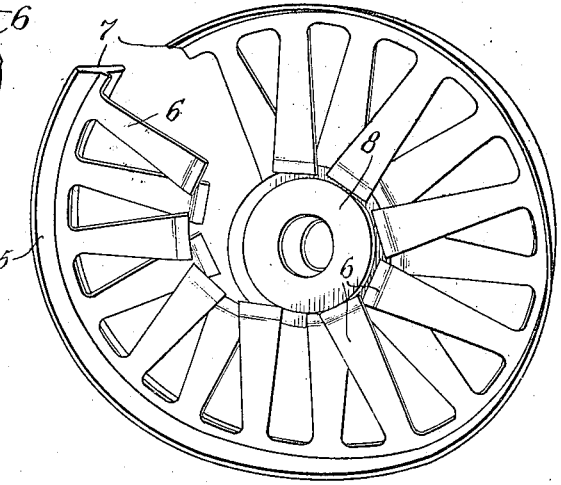
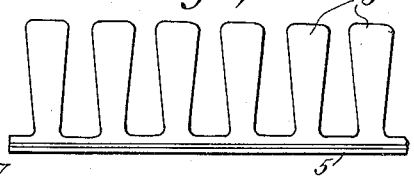
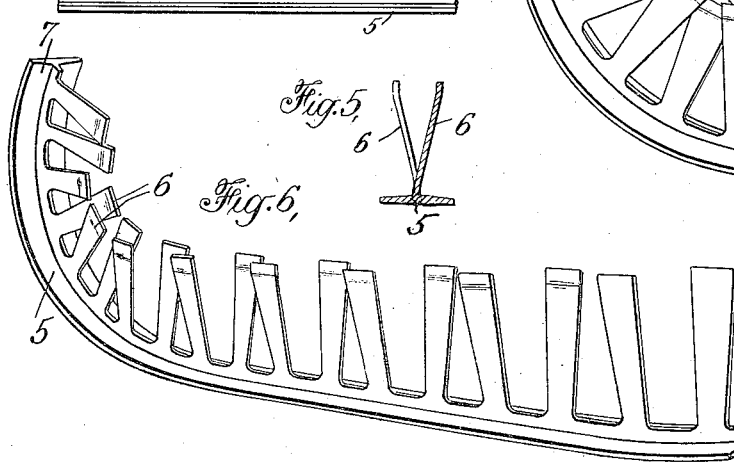
INVENTOR  
Ferdinand C. Dittmar  
BY Pennie, Davis,  
Marvin & Edmonds  
his ATTORNEYS Nov. 11, 1924.
F. C. DITTMAR
1,515,153
WHEEL
Original Filed June 6, 1919    2 Sheets-Sheet 2
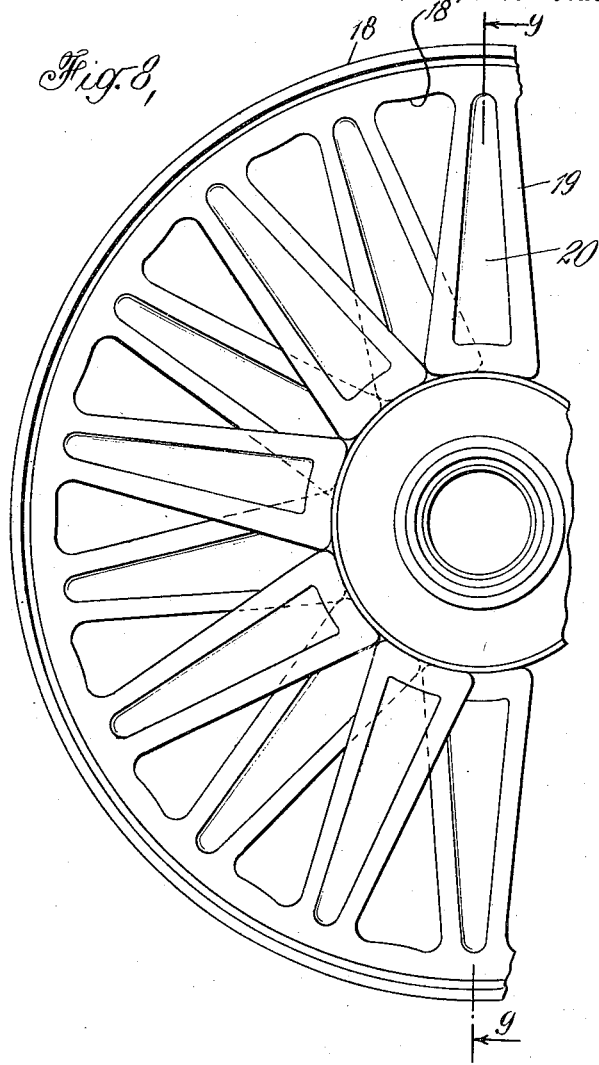
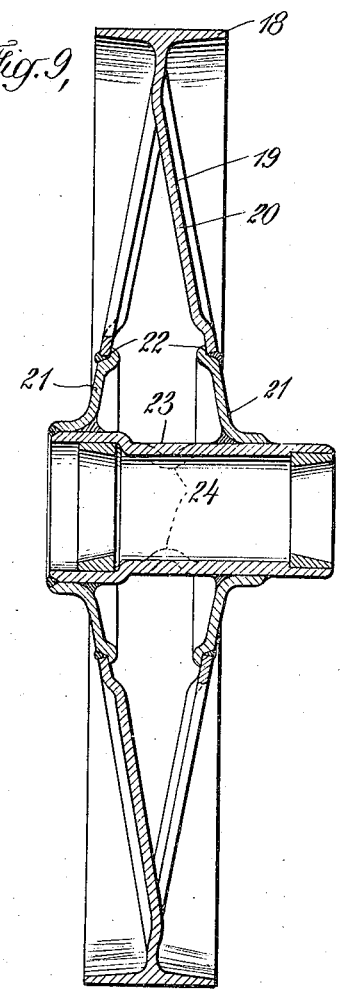
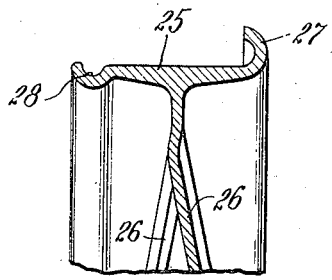
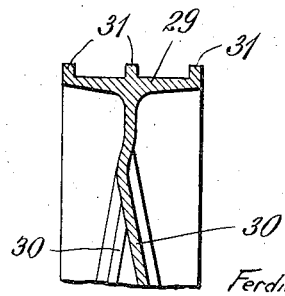
INVENTOR
Ferdinand C. Dittmar
BY
Pennie Davis Marvin & Edmonds
his ATTORNEYS Patented Nov. 11, 1924.

1,515,153

UNITED STATES PATENT OFFICE.

FERDINAND C. DITTMAR, OF SAN FRANCISCO, CALIFORNIA, ASSIGNOR, BY MESNE ASSIGNMENTS, TO BETHLEHEM STEEL COMPANY, OF BETHLEHEM, PENNSYLVANIA, A CORPORATION OF PENNSYLVANIA.

WHEEL.

Application filed June 3, 1919, Serial No. 302,238. Renewed March 26, 1924.

*To all whom it may concern:*

Be it known that I, FERDINAND C. DITTMAR, a citizen of the United States, residing at 57 Post Street, San Francisco, in the county of San Francisco, State of California, have invented certain new and useful Improvements in Wheels; and I do hereby declare the following to be a full, clear, and exact description of the invention, such as will enable others skilled in the art to which it appertains to make and use the same.

This invention relates to wheels and particularly to a fabricated metal wheel of simple and relatively inexpensive construction, and capable of successfully withstanding the stresses incident to employment thereof in vehicles, such as automobile trucks.

It is to be understood that my invention, while peculiarly adapted to uses requiring great strength and rigidity, is equally desirable, when embodied in lighter construction, for general purposes.

Among the objects of the invention is the provision of a metal wheel which is relatively light in weight and at the same time strong and rigid, and which may be constructed at a materially lower cost than metal wheels of equal capacity as heretofore known and used.

A further object of the invention is the provision of a method of constructing wheels from rolled or structural steel shapes and particularly to utilize such material in the most economical manner whereby the cost of constructing wheels according to the invention is reduced to a minimum.

Further objects and advantages of the invention will be apparent as it is better understood by reference to the following specification when read in connection with the accompanying drawing, in which,—

Fig. 1 is a side elevation of a completed wheel according to my invention;

Fig. 2 is a section on the line 2—2 of Fig. 1;

Figs. 3 to 7 inclusive are illustrative of the method of constructing the wheel;

Fig. 8 is a view in elevation of a slightly different form of wheel;

Fig. 9 is a section on the line 9—9 of Fig. 8; and

Figs. 10 and 11 are sectional details illustrating portions of wheels constructed from special shapes to provide rims of the desired character on the wheels.

Metal wheels, particularly for automobile purposes, have heretofore been constructed in various forms. For heavy trucks, such wheels are made of cast steel and are necessarily heavy. Since cast steel wheels are manufactured and sold on the basis of the weight of the metal used, they are relatively expensive. Their excessive weight increases the non-productive load of the vehicle, thus unnecessarily consuming power and reducing the life of the tires.

I have discovered that wheels may be readily and economically constructed from rolled or structural steel shapes, either commercial or otherwise. Thus, standard I, T or channel sections may be utilized, the flange of the sections forming the felly of the wheel, while the web is cut to provide the spokes. When I sections are employed, the material may be cut in such a manner, that both flanges and substantially all of the metal in the web is utilized in the wheels, which are thus produced in a most inexpensive manner. For example, in producing two wheels from a standard I section the only metal lost is the two half spokes at the ends of the section. Channel sections may be secured back to back and employed as I sections. Special shapes may be rolled, to be formed into wheels of such sizes, as may not be economically produced from standard sections, and to provide a felly or rim of special shape. Clincher or Q. D. rims may thus be provided on the wheel. It may also be desirable to provide a reinforcement on the rim and special shapes may be rolled, in which such reinforcement is formed in the flange. The wheels may also be formed by welding spoke members to a short stemmed T section.

My invention comprehends both the wheel and the method of producing it, as hereinafter described, with particular reference to the drawing. In carrying out the invention a suitable length of a rolled shape, preferably an I section is subjected in a press, or other device capable of accomplishing the work, to an operation in which the web is divided as indicated in Fig. 3 of the drawing. A punch and die (not shown) are preferably employed for this purpose. The two flanges 5 of the section are thus separated and provided with a plurality of spaced projecting members 6, adapted to form the spokes of the wheel, as indicated in Fig. 4. Preferably a section is selected, of such dimensions as to provide material for two wheels of the required strength when substantially all of the material in the web is utilized. There is then no waste material to be paid for as rolled steel and sold as scrap.

The alternating spoke members 6 are splayed as indicated in Fig. 5 and the ends 7 are bent slightly. The flange 5 is then rolled as indicated in Figs. 6 and 7, care being taken to insert the hub 8 before the wheel is closed. The flange 5 is preferably bent or rolled cold, but the material may, of course, be heated to facilitate the bending operation and any mechanical means may be employed to perform or to assist in the performance of this operation. When the ends 7 have been brought together, they are welded and the wheel is rolled to smooth out any irregularities in the contour of the flange. A length of the original section is selected which provides a wheel of slightly larger diameter than is desired in the finished product. To bring the wheel to the desired diameter, it is subjected, in a bulldozer, to compression until it is sufficiently contracted.

The spoke members 6 are now welded or otherwise fastened to the hub. Preferably the welding operation is performed simultaneously at three points, on one side of the wheel, and spaced equally about the hub, and the operation is repeated until all of the spokes have been secured to the hub.

In Figs. 1 and 2, I have illustrated one form of wheel constructed in accordance with my invention in which 9 indicates the rim and 10 the spokes formed integral with the rim. The spokes 10 are welded to a hollow annulus 12 which may be strengthened by webs 13. A hub 14 is inserted in the annulus 12 and is preferably held in assembled relation therewith by a plate 15 and bolts 16 extending through said plate and a flange 17 on the hub. It will be noted that the spokes 10 are broadest near their junction with the annulus 12 and taper toward the rim. Greater strength is thus provided as the leverage and bending stress on the spoke increases.

In Figs. 8 and 9 of the drawing, a slightly different and preferred form of my invention is illustrated. The felly or rim 18 is provided with integral spokes 19, cut from the web of the original rolled section and having strengthening beads 20 struck up from the body of the metal. The spokes 19 are splayed and are welded at their ends to annular members 21 which may be punched from metal, such as steel plate, and formed as indicated in the drawing, with recessed edges 22 adapted to receive the ends of the spokes 19 and which facilitate assembly of the wheel. The beads 20 are preferably formed during the splaying operation and assist materially in preventing bending of the spokes under severe compressive stresses.

In cutting the spokes 19, the ends are preferably curved as indicated in the drawing, the radius of the curve being that of the recessed edges 22 so that the spokes fit the edges 22 closely and a welding line of uniform radius is provided. The welding operation is thus materially facilitated. Moreover, in thus cutting the spokes, that portion of the web remaining with the rim 18 is curved as indicated at 18' so that the rim is materially strengthened at the point where the greatest strains occur. The members 21 are so formed that they form a straight line with the spokes. All stresses are transferred along these lines to the hub and no distance piece between the members 21 is required.

The members 21 are welded or otherwise fastened to a hub 23 which preferably, when the wheel is fabricated, is annularly indented as indicated in dotted lines at 24. After the wheel has been completed a suitable expander (not shown) is inserted in the hub to expand the indented portion. The hub is thus elongated and the spokes are tensioned by this operation. Similarly the tension of the spokes may be reduced by striking a blow on the end of the hub.

In Fig. 10 of the drawing, I have illustrated a Q. D. rim 25, formed from the flange of the rolled shape from which the wheel is constructed, and having spokes 26 integral therewith. In the construction of such a rim it is necessary to roll a special shape in which sufficient metal is provided in the flange to permit the formation by rolling or otherwise, of the gripping edge 27 and recess 28 to receive the tire holding rim. In Fig. 11, I have illustrated a slightly different form of my invention in which the rim 29, having integral spokes 30, is provided with strengthening ribs 31. These ribs are preferably rolled on the flange of the section from which the wheel is constructed and serve to strengthen the rim 29.

From the foregoing it will be understood that I have perfected a fabricated metal wheel which is light in weight, rigid, and adapted to successfully meet the stresses to which it is subjected in use. The metal employed is much stronger for a given weight than cast steel and it is possible, therefore, to construct relatively light wheels of sufficient strength to meet the demands of the trade. I have perfected moreover, a method of producing such wheels employing material economically and requiring a minimum number of operations to complete the wheels.

Wheels constructed in accordance with my invention may be made and sold for substantially one-third of the price necessarily obtained for cast steel wheels of the same strength.

Obviously various changes may be made in the details of the method of construction and in the form and arrangement of the wheel elements without departing from the invention or sacrificing any of its material advantages.

I claim:

1. A wheel constructed of a flanged metal section and comprising a rim and spokes integral therewith, a hub, and spaced annular members supported on said hub and arranged to receive and transmit stresses from the spokes and in alignment therewith to the hub.

2. A wheel constructed of a flanged metal section and comprising a rim and spokes integral therewith, a hub and spaced annular members having recesses to receive the ends of said spokes, said members being secured to said hub and spokes.

3. A wheel constructed of a flanged metal section and comprising a rim and spokes integral therewith, a hub, and spaced annular members secured to said hub and to the ends of said spokes, said ends being curved to conform to said annular members whereby welding of the spokes to said members is facilitated.

4. A wheel constructed of a flanged metal section and comprising a rim formed from the flange and spokes integral therewith and formed from the web of said section, a hub, and spaced annular members secured to said hub and to the ends of said spokes, the portion of the web between said spokes being widest midway between the spokes whereby the wheel is strengthened at the point where the greatest stresses are applied thereto.

In testimony whereof I affix my signature.

FERDINAND C. DITTMAR.